(12) United States Patent
Dempsey

(10) Patent No.: US 9,076,184 B2
(45) Date of Patent: Jul. 7, 2015

(54) METHOD AND APPARATUS FOR ENCHANCING OPEN HOUSE VIDEO TOURS FOR REAL ESTATE PROPERTIES

(76) Inventor: John Patrick Dempsey, Camarillo, CA (US)

( * ) Notice: Subject to any disclaimer, the term of this patent is extended or adjusted under 35 U.S.C. 154(b) by 0 days.

(21) Appl. No.: 12/455,891

(22) Filed: Jun. 8, 2009

(65) Prior Publication Data

US 2010/0312670 A1    Dec. 9, 2010

(51) Int. Cl.
- G06Q 30/02    (2012.01)
- G06Q 10/10    (2012.01)
- G06Q 10/06    (2012.01)
- G06Q 30/06    (2012.01)
- G06Q 10/08    (2012.01)
- G06Q 50/16    (2012.01)

(52) U.S. Cl.
CPC ............. *G06Q 50/16* (2013.01); *G06Q 30/02* (2013.01); *G06Q 30/0643* (2013.01)

(58) Field of Classification Search
CPC ........................................... G06Q 50/16
USPC ........................... 705/313, 1.1–912
See application file for complete search history.

(56) References Cited

U.S. PATENT DOCUMENTS

| | | | |
|---|---|---|---|
| 6,839,880 B1 | 1/2005 | Morse et al. | |
| 7,254,559 B2 | 8/2007 | Florance et al. | |
| 7,313,604 B2 | 12/2007 | Wood et al. | |
| 2001/0025261 A1* | 9/2001 | Olefson | 705/27 |
| 2005/0187832 A1* | 8/2005 | Morse et al. | 705/27 |
| 2006/0015925 A1 | 1/2006 | Logan | |
| 2006/0020522 A1 | 1/2006 | Pratt | |
| 2007/0038773 A1* | 2/2007 | White et al. | 709/233 |
| 2007/0043770 A1 | 2/2007 | Goodrich et al. | |
| 2008/0201412 A1 | 8/2008 | Wayne | |

\* cited by examiner

*Primary Examiner* — Jonathan Ouellette

(57) ABSTRACT

A method and a system to provide real estate agents across the United States the ability to support and enhance open house video tours for residential and commercial properties using the Internet.

7 Claims, 4 Drawing Sheets

Update Listing Format for 123 Main Street

```
Set Listing Format      Set To Agent's Default Format ~ 54

Block 1.   A1 = Property Info (left), Agent Info (right)
Block 2.   V1 = Video (center)
Block 3.   R1 = Remarks with Title
Block 4.   S1 = Slideshow Large (center)
Block 5.   P1 = All Photos with Titles (center)
Block 6.   D5 = Property Details 2 Columns
Block 7.   M1 = Map (center)
Block 8.   BL = Blank
Block 9.   C1 = Comments from Agent
Block 10.  OH = Open House Schedule Set Blocks To:  Blanks ~ 58
                Agent's Defaults ~ 60
                OpenHouseOn.com Defaults ~ 62
```
(52, 50, 56 labels)

METHOD AND APPARATUS FOR ENCHANCING OPEN HOUSE VIDEO TOURS FOR REAL ESTATE PROPERTIES

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

A method and a system to provide real estate agents across the United States the ability to support and enhance open house video tours for residential and commercial properties using the Internet.

Prior art includes flyers containing text and/or photos; real estate advertising in newspapers and magazines; real estate websites on a national, local office, and agent level; slide shows of property; virtual media tours where motion is simulated by moving in or out of a still photo while transitioning among a set of photos; Multiple Listing Services (MLSs); 360 degree panoramas of property found on web sites, some defined with "hotspots"; DVD produced material to promote a property; on-site open house visits; U.S. Pat. Appl. 20060020522 to Pratt (2006) designed to support real-time broadcast of an open house visit; TV broadcasts, such as HGTV channel; AM radio frequency narrative broadcast describing property at the property location; property information texted to a cellular device; and video tours of properties, e.g., YouTube videos.

SUMMARY OF THE INVENTION

A method of displaying an interactive open house video tour using a website hosted on a webserver. The website is in communication with a plurality of computing devices, such as laptops, personal data assistants, mobile phones and other portable computing devices. The method includes the capability to upload to the website from a first computing device, this first computing device is under the control of a listing agent or seller of property. The site stores at least one user, as an example an agent is the user, created video stream wherein the user created video stream contains a video image of the property that is available for sale or lease. The agent can mail, via the post office, a recorded video of the property to the website master or website organization for video conversion, subsequent editing, and uploading to the website. The recorded video is stored on a physical media such as a tape or computer storage media. The postal office mailing system is one intake means. Other intake means include commercial package delivery services.

The agent performs a step that uploads to the website via the internet a plurality of identification data that describes the property in detail. The website, in actuality the website master or website organization, commands a transformation of the video image of the property into a digital data set wherein the digital data set is a transformed, or converted, image of the property.

The converted image has inserted therein at least one transition decision point wherein said transition point contains coordinates that correlate to a transformed image direction of motion, here the direction of motion is the desired viewing path through property image in a direction that is under the control of the buyer, that is a potential buyer viewing the property online or user at the property location. A storing of said transformed image of said property on said website is performed. The converted image is tagged with the user provided identification data wherein said user provided identification data are used to locate said transformed image of said property stored on said website once the buyer establishes an interactive session between a second computing device, that of the buyer and the website.

Estimating a communications connection speed between the website and said second computing device, that of the buyer, is used to determine the communications connection speed that ultimately determines a download rate for the converted image, where the converted image is a video, and identification data is performed in an additional step. There is a further step of accepting a user query from said second computing device, the buyer, wherein said user, the buyer, query is accepted by a user interface provided by said website. The user query contains a subset of information that can be compared to said the information provided by the agent and directed towards the property. A comparison step then compares the user query to said identification data stored on said website wherein a result of a comparison produces a match result.

The next step is to retrieve the transformed image of said property from said website based upon said match result and then downloading said transformed image from said website to said second computing device, the buyer's, at said download rate wherein said transformed image is displayed on an interactive display controlled by said second computing device. There is a further step for the said website to respond to a path command initiated by a second user, the buyer, making a selection of said transition decision point displayed on said interactive display device wherein said path command directs a playback sequence of said transformed image of said property for display on said interactive display device, said playback sequence having a direction of motion correlated to said selection of said transition decision point. The path command allows the buyer to virtually walk through the property as they desire by manipulating the controlling interface. Lastly there is a terminating step, the interactive session ends upon a terminate command initiated from the interactive display device. A terminate command is also implemented by selection of an alternate hyperlink in another embodiment of the invention.

The present invention is an apparatus that includes computer hardware, internet servers, devices to extract an analog signal from a video tape, computer software that performs conversion and modification of the extracted analog signal obtained from a video tape into a digitally formatted video stream, computer software that creates a plurality of user interfaces, wireless routers located at the property that is the subject of the aforementioned video tape, and computer software to search a plurality of digitally formatted video streams stored on the internet servers, and computer software and hardware that downloads a particular digitally formatted video stream to a users computing device.

The present invention is summarized as follows. An interactive open house video touring system comprising: a webserver wherein the webserver hosts an interactive open house video touring website. An internet communications connection is established between the website hosting the open house video tour software and an agent's computing device. A second internet communications connection is established between the website and a buyer's computing device. An agent's interface is provided by and is in communication with the interactive open house video touring website. The first agent's interface accepts for uploading an open house video stream uploaded from the agent's computing device. A conversion system in communication with said interactive open house video touring website wherein said conversion system converts at least one said open house video stream into an interactive digital open house video stream in conjunction with an editing interface in communication with the interactive open house touring website. The editing interface accepts a set of agent commands to add a set of agent content to said interactive digital open house video stream. The agent content is stored in a plurality of data blocks wherein the data block comprises a location index to locate said digital open house video stream within said open house video touring website, said agent's identification information, and a set of descriptors to describe a plurality of attributes for a property that is the subject of said interactive digital open house video stream. A search interface in communication with said interactive open house video touring website wherein said search interface accepts a first input from a buyer at least one of said plurality of attributes for said property that is the subject of said interactive digital open house video stream, said search interface searches the block content and outputs the appropriate interactive digital open house video stream corresponding to said first input from said buyer. A download interface in communication with said interactive open house video touring website wherein said download interface retrieves a particular digital open house video stream based upon said search interface outputs, said download interface downloads to a buyer's computing device said particular digital open house video stream. An interactive interface in communication with said interactive open house video touring website, said interactive interface is operated by a second input from said buyer wherein the second input determines an interactive display route. The interactive display route is a virtual self guided tour through the interactive digital open house video stream.

BRIEF DESCRIPTION OF THE DRAWINGS

The features described above, other features, aspects, and advantages of the present invention will become better understood with regard to the following description, appended claims, and accompanying drawings where:

DETAILED DESCRIPTION OF THE INVENTION

Figure 1:
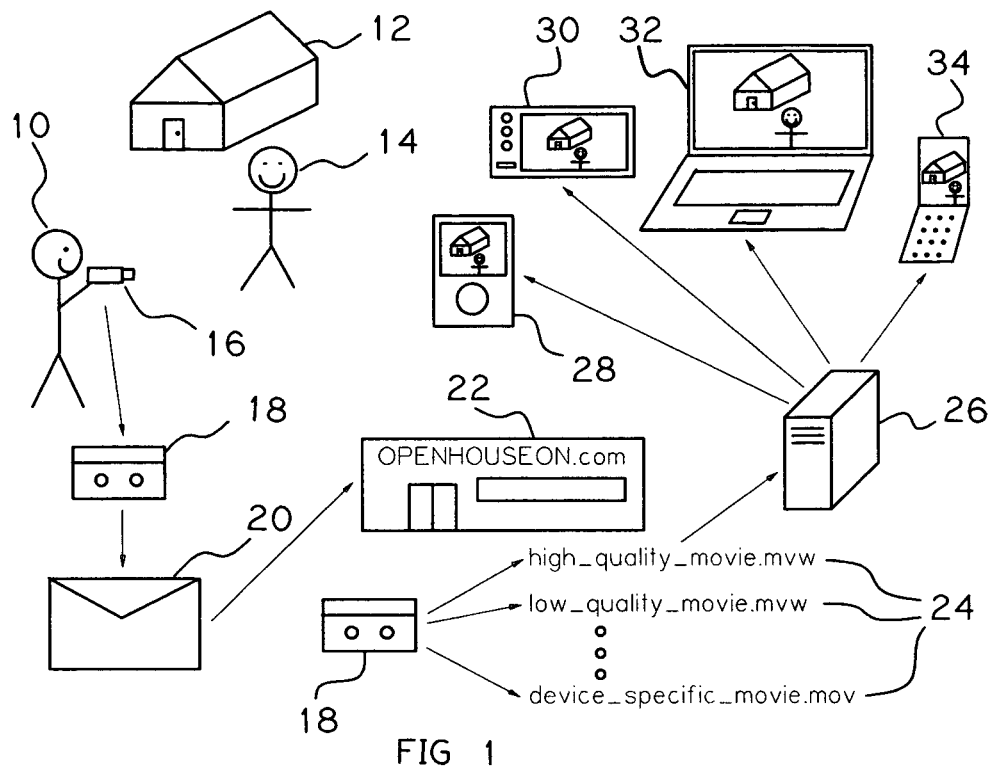
FIG. 1 is a drawing showing how real estate agents can be videotaped to support open house video tours. The tape is sent to a centralized video conversion site and converted into one or more video formats which are uploaded to a website. From the website, end users are able to view open house video tours on various media devices.

The present invention provides real estate agents across the United States and throughout the world the ability to support and enhance open house video tours for both residential and commercial properties using the Internet. Specifically, real estate agents can upload information contained on a video tape or upload information stored on a computer medium that is part of a digital video camera, to a centralized video conversion site. Once the information is uploaded it can be converted into a format that supports nationwide open house video tours hosted on one or more websites. The website estimates the connection speed between the website and the end user's website browser to determine the highest quality open house video to download without user intervention.

The present invention helps real estate agents support open house video tours for the majority of the United States real estate market on the first day of operation, including sparsely populated areas. Real estate agents no longer need to locate local professionals, have knowledgeable friends, or perform the necessary media to video file conversions themselves.

While real estate agents can easily take photographs of properties and post them to a website, far fewer agents will have the necessary hardware, software, desire, and ability to convert videotaped media, e.g., convert a video on MiniDV tape into a video file, which then typically needs to be converted again into a video format supported by a website. The present invention will, without requiring any user interaction, calculate an estimated network speed value that determines the higher quality video to download without impacting the overall responsiveness of a website. To support this approach, two or more videos of different quality and size but based on the same open house video tour would be stored on the website.

The approach in one embodiment of the invention will allow potential buyers free wireless access to video tours, photos, and property details when in close proximity of the property. Our method will allow real estate agents and others to quickly customize various real estate web pages and printouts using "blocks." Our method will support interactive open house video tours, where potential buyers can interact with the video itself to decide what to see next in the video.

The present invention supports the following methods:
1. This invention allows physical media, such as video tape, to be converted by a video convertor at a national video conversion site and the resulting videos created for different media players, wrappers, and codecs (coder/decoder) to be uploaded to one or more national websites to support nationwide open house video tours. The main advantage of this approach is agents no longer need to locate local professionals to create website videos and instead can send their video tapes to a business which will convert and post them to national real estate websites as a service. This instantly enables real estate agents from anywhere in the United States a way to post videos of their properties, regardless of whether or not local professionals are available in their area. The conversion from a video format to a digital video format is required of the agent's source video when submitted in an analog format.
2. Without requiring any user intervention and by using an estimated network speed value for a user's connection to a website, the software determines which video for a property to download. For fast connections, higher quality, larger size videos are downloaded, while for slower connections, lesser quality, smaller size videos are downloaded instead. The calculated network speed includes an estimation of how fast the network connection is between the connected device and the website.
3. With wireless local area network (WLAN) access provided free at the property site and an advertised website Universal Resource Locator (URL) for the property, users can view open house video tours, photos, and obtain property details using wireless devices, e.g., such as a wireless laptop, in close proximity to the actual property.
4. Using "blocks", which represents a block of data, such as text, video, photos, slideshow, or any other information, users can dynamically and easily customize how web pages and print outs are displayed. For example, the address and agent information can be displayed on top in the first block. The second block displayed below the first block on the website can contain property general property information, such as the number of bedrooms, bathrooms, square footage, lot size, price, and other information. The third block can contain an open house video tour. The fourth block can be a slideshow where each slide has an optional title and short description associated with it. The last block can contain a hybrid map, showing a graphical satellite photo with roads overlaid on the satellite image. The number of blocks defined and the number of options for each block can vary. The order of the blocks can easily be rearranged to the agent's preference.
5. This invention supports interactive open house video tours, where users can make decisions on what they want to view next by interacting with the web page and in some cases with the video itself to interrupt the current video to determine which video to view next. A buyer's input generated from the buyer's computer will proceed through an interactive display route, the interactive display route allows the buyer to select which video clip or section of the property to view next. Additionally the buyer's input can optionally select appliances or other objects in the video.

While the real estate area of previously owned homes is emphasized in this invention, other areas can also benefit from this invention, such as video open house tours of new homes, commercial properties, industrial properties, undeveloped properties, land, foreclosures, apartments, rentals, hotels, motels, vacation destinations, restaurants, motorized vehicles, aircraft, water vessels, schools (elementary, junior high, and high schools), colleges, universities, areas in the medical field, as well as, many other areas.

Further objects and advantages of this invention will become apparent from a consideration of the drawings and their ensuing description.

To support nationwide open house tours on the Internet, properties can be videotaped using various technologies. For example, a real estate agent can video tape a property or have someone video tape them walking and narrating an open house tour. The open house tour will usually show the majority of the property.

The video tape, DVD, video file, or other media are then sent to one of the company's centralized video conversion sites. For example, media can be mailed, e-mailed, or use a file transfer utility (e.g., FTP) to a business site. The company performs the conversion (e.g., tape to video) into one or more video formats and places these videos on the business' national website or associated websites.

Multiple videos in different formats can be generated based on the one tape, DVD, video file, or other media received. For example, videos can be created for different media players, e.g., QuickTime Player, Windows Media Player, Flash Player, and other video players; using different wrappers, such as WMV, MOV, FLV, and other file formats; and, using different codecs (coder/decoder), such as MPEG-4 part 10/H.264/AVC, VC-1, VP6, and other codecs. Of course, each of these possibilities support different options, e.g., different data rates, frame rates, frame types, aspect ratios, resolution, sound quality, and whether to deliver video and audio content by streaming a file or to progressively download a file.

Videos can be generated specifically for a plurality of mobile devices, such as laptops, cell phones, smartphones, personal digital assistants (PDAs), and/or video players, such as an iPod™. A property entry can be created on the website where video tours, property features, photos, remarks, maps, and other descriptive attributes can be used to provide additional information regarding the property.

FIG. 1 shows how a real estate agent 14 can be videotaped by another person 10 using a video camcorder 16 of a property 12. After recording a video open house tour of a property, the video tape 18 can be mailed in an envelope 20 to a centralized video conversion business site 22 and converted into one or more video formats 24 which are uploaded to a webserver supporting a website 26. From the website 26, end users are able to view open house video tours on media devices, such as video players 28, including an iPod™, PDAs 30, laptops 32, and phones 34, including smartphones.

The present invention supports open house video tours for the majority of the United States real estate market on the first day of operation. Improved support in areas where an existing franchise, business, or person is physically located to videotape, perform the conversions, and can upload the results to a website is had with the present invention. With our method, the real estate agent, a fellow agent, friend, or a professional can videotape the open house tour and then send in the media for conversion. All that is required is a videotape recorder and media.

Professionally done videotaping usually contains transitions, background music, dubbed narration, and other "extras" which enhances the original video taken by giving it a professional feel. But as a result, the end result costs more due to the extra time needed to customize and condense the amount of video tape taken on-site.

Compare this with our approach, where we encourage, but do not require, that the real estate agent is actually filmed as part of the video. While walking through a property, the real estate agent describes the property and the videotaped session is placed on the website. Professional presentations can look better, but our approach is less costly. Using our approach, the videos are more of a "what you see is what you get" video versus a professionally edited version. Of course, as an added service, some real estate agents will want a professionally edited version created for them, which can also be handled. But for most videos, only basic editing, if any editing at all, would be done to the videos prior to placing a video on the website.

Real estate agents and others can perform video conversions themselves and upload the videos to a website. They can also utilize the website's features, e.g., to add and edit property entries and upload property photos.

After Estimating Network Speed, Download Appropriate Open House Video

Today videos of real estate properties are typically small in size and of low quality to ensure quick download over slow networks. For example, downloading a 100 megabyte (MB) file over a Wireless-G (802.11g) network can download approximately 1% of the file in 1 second. As such, the size and quality of the video must be decreased to support a responsive website. For example, a low quality video could support a resolution of 320×200 pixels in size, with less frames displayed per second, less audio quality, and with an overall size of 2 megabytes or less.

Today some websites allow the user to decide whether to download a high definition video by allowing the user to click on a button or select a link. But it's up to the user to decide whether or not their connection speed will support a quick download or they are simply willing to wait for a slow download to occur in order to view a higher quality video.

To allow for higher quality videos without user interaction, our method first estimates the user's network speed. This check is done each time the user initially visits our site. A session constant is set for the connection speed and is used during the user's session. If the user visits our site again, the user may have disconnected his laptop from a high speed cable modem connection and may now be using a much slower wireless connection, or vice versa. As such, the site determines the user's network speed for each session automatically.

To estimate the network speed of a user when the user visits our website, various methods can be used. As one example, a method could record the start time on the server when the user initially visits our website. Next, data is written to the user's computer using "cookies". Once the write is complete, we then read the just written text. When the read is complete, we record the end time on the server. Based on the amount of data written and the difference between the end and start times, an estimate of the actual network speed connection for the user's system can be calculated. The more data written and read, the more accurate the network speed will be. In addition, rather than determine the actual network speed which could require a large amount of data to be written and read, and in turn, would make a website seem slow and unresponsive, a much smaller amount of data can be used to determine an estimated network speed value.

Without requiring any user intervention and by using the estimated network speed value, the software or any other means determine which video to download. The calculated network speed value is a measure of the communications connection speed between the website and the buyer's computing device. To support this method, two or more videos created with different options but based on the same final version of the open house video tour of the property would reside on the website. For fast connections, higher quality, larger size videos are downloaded while for slower connections, lesser quality, smaller size videos are downloaded instead.

Support Wireless Open House Tours in Close Proximity of Property

With wireless local area network (WLAN) access or similar wireless technology provided at the property site and an advertised website URL for the property, users can view open house video tours, photos, and obtain property details using wireless devices in close proximity to the actual property. This is similar to prior art where a radio broadcast provides a narrative description of the property for sale within a close proximity of the actual property.

Our approach will advertise a website URL that users can access using their wireless enabled laptops, PDAs, phones, smartphones, and/or any other similar devices. In addition to viewing an open house video tour when available, users can obtain details regarding the property (e.g., property features, square footage, listing price, selling agent's contact information, real estate office contact information, property descriptions, photos, and open house schedules) while in close proximity of the property.

The property will broadcast a wireless signal (e.g., A, B, G, or N wireless signal, 3G or 4G wireless signal, or use other similar or newer wireless technology) which provides potential buyers an Internet connection to view the property listing on their device (e.g., on a laptop). In some cases, the wireless router or similar device may need to be moved closer to the front of the property, placed in the garage, or may require a wireless router range extender or similar device to be set up in order to extend the range of the wireless connection for the property. To allow all users to connect, no security key would typically be used in the wireless router. As an alternative embodiment, the wireless signal can be transmitted by a hardware/software device, one example being a computer supporting wireless communications, that is located at the property site and stores the property data on the device itself, where this property data may or may not be updated using the Internet.

The URL can be posted on the property site or advertised in some manner, e.g., using a flyer or newspaper ad. For example, a sign in front of the property can read:

View Open House Tour Now At:
http://OpenHouseOn.com?12345 where 12345 represents the website id for this property.

Or, the address of the property's address can be used as the URL too (if the URL is available) to create signs like:

View Open House Tour Now At:
http://123MainStreet.com

Posting a sign is one example, but any method can be used to identify the property for any Internet access. Properties can be for sale, for rent, for lease, or have any other designation.

Figure 2:
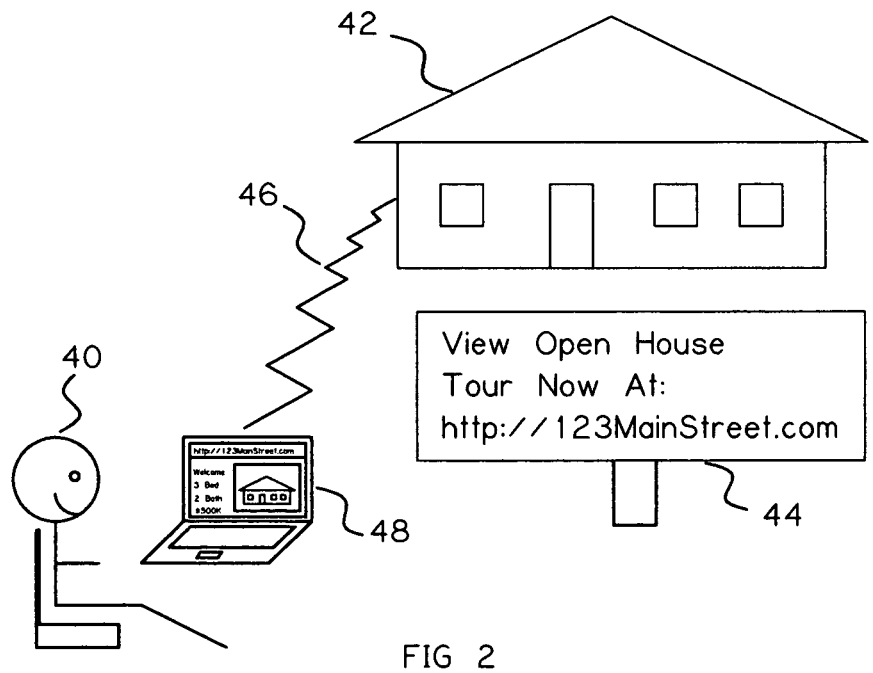
FIG. 2 is a drawing showing how potential buyers in close proximity of the actual property can connect to the Internet using a wireless connection supported by the property to view open house video tour, photos, and property details on a wireless device, such as a laptop.

FIG. 2 shows how a potential buyer 40 in close proximity of the actual property 42 can view the advertised URL on a sign 44 and connect to the Internet using a wireless connection 46 supported by the property 42 to view an open house video tour, photos, and property details on a wireless device, such as a laptop 48.

One skilled in the art will find that some devices (e.g., broadband cards connected to laptops) to access websites on the Internet are used to access the same information in front of a property. But unlike our approach, these users must pay a fee in order to access the Internet in order to obtain the property information desired at different locations. Using our approach, wireless access is free.

Customize Web Pages Using "Blocks"

A block represents data. In one embodiment a block is a data structure or a plurality of data structures. A block of data can be text, video, photos, slideshow, maps, header or footer banner graphics, or any other information or combination of information formatted differently. For example, you can have one block containing text describing the property, a block containing a slideshow or an open house video tour, or a block with agent's comments on the property.

A block can display the same information but be displayed in different sizes, fonts, or positions within a block. For example, three blocks could be defined to display the same slide show but in different sizes and using different options.

Block LargeSlideShow can be selected to show a large slideshow (e.g., where each photo in the slide show is 1280×720 pixels in size). Block MediumSlideShow can be for a medium size slideshow (e.g., 320×200 pixels). Block SmallSlideShow can be for a small size slideshow (e.g., 120×80 pixels). Options could be supported such as providing a title and/or brief description located at the bottom or top of each photo in the slide show, or to view small icons of each photo at the bottom or along the side of the slideshow to allow the user to quickly select which photo to view next, or to allow user controls to pause, play, go back, or go forward a photo within a block. As an alternative, a block could display all the photos on the website at once with a title and brief description under each photo.

Using blocks, end users can customize how a property listing, an agent's page, a real estate office page, an agent group, and other web pages are displayed. Blocks can be "stacked" or use a location index, i.e., be indexed, to define the order in which blocks will be displayed on the web page. Blocks can also be used to define how print outs will be formatted, e.g., defining the order of information printed on a flyer for a property listing.

By ordering "blocks", users can easily customize how a web page is displayed on the website. The block order can be saved. Once saved, any changes that were made can instantly be viewed on the website. Realtors can define their own default settings or use the website's defaults. For example, a realtor can define their own property listing format and use it to provide a common format for all of the realtor's property listings, but could alternatively define a different format for each property.

One skilled in the art will be able to compare this block approach with displaying real estate property information where either a "standard" format is used or a few preconfigured formats are selected from, but where the user cannot fully control the presentation order of the selected elements.

A block can support displaying all supported and/or not supported property attributes. Blocks can also contain the same information formatted differently, e.g., the basic information for the home can be on the left side while the agent's information can be on the right side, or visa-versa. Another example could be supporting different blocks for displaying the same information in one, two, or three columns. Text can display remarks, property details, agent's comments, or when onsite open house tours are scheduled.

Figure 3:
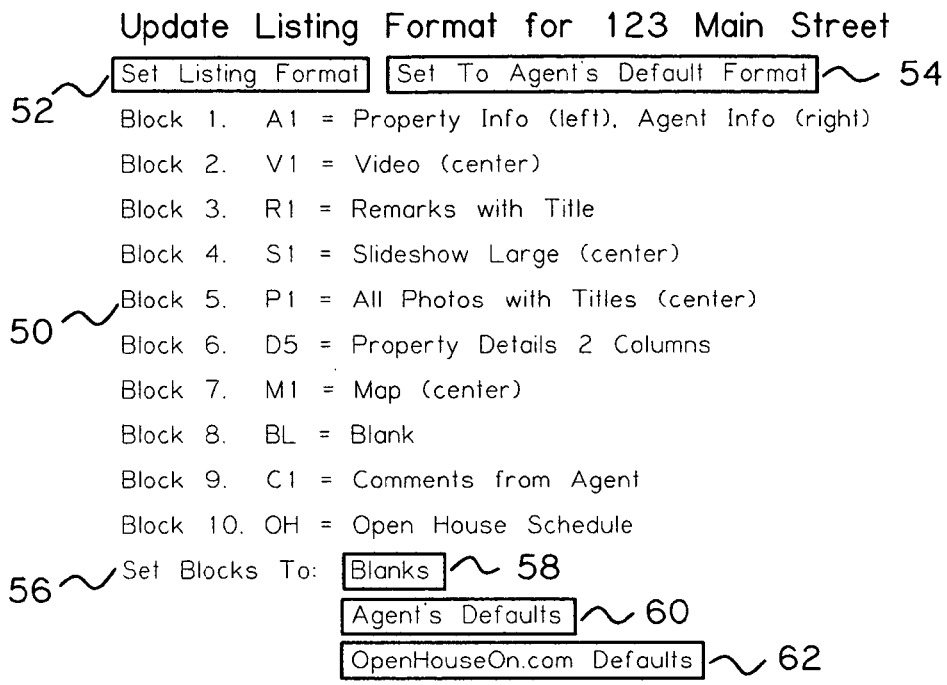
FIG. 3 is a drawing showing how blocks are used to define the content of a current listing format for 123 Main Street with various buttons to set the listing format.

FIG. 3 shows how blocks 50 are used to define the listing format for the 123 Main Street property. Once set, the Set Listing Format button 52 can be selected to save any changes to the listing format or the Set To Agent's Default Format button 54 can be selected to set current block order to become the agent's default format. The "Set Blocks To:" buttons 56 allow agents to set all blocks to blanks 58, set blocks to the agent's defaults 60, or set blocks to the website's default order 62.

Figure 4:
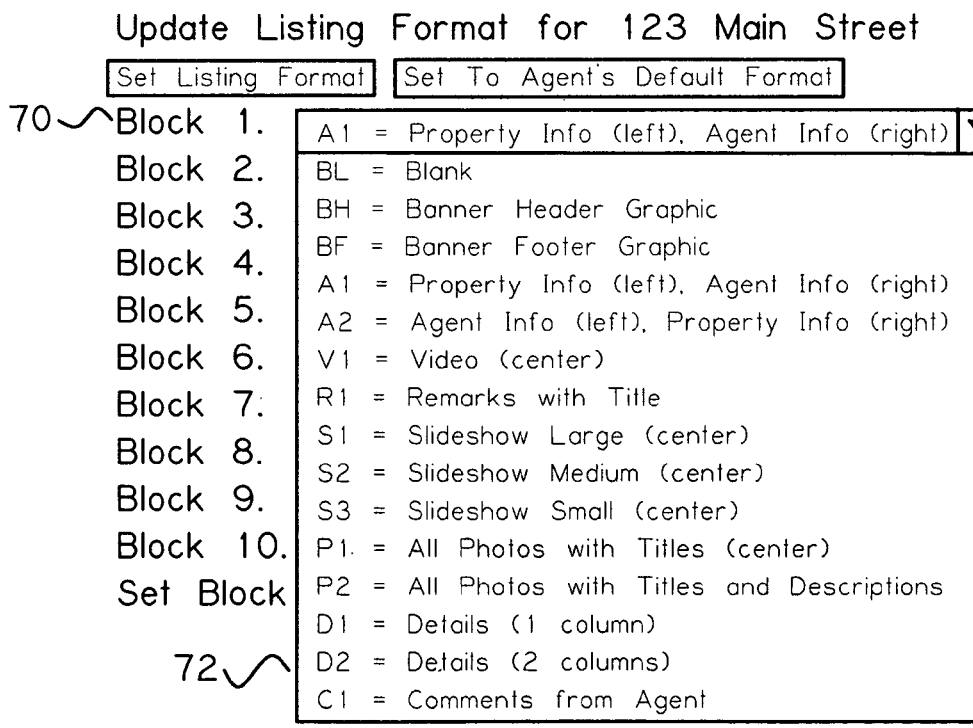
FIG. 4 is a drawing showing how real estate agents can set Block 1 to various options from a pull down menu.

FIG. 4 shows how real estate agents can set Block 1 70 to various options from a pull down menu 72. From the pull down menu 72, agents can select from a large number of options, such as header or footer banner graphics, property/agent information, open house video tour, remarks, slideshows, all photos, property details, and agents' comments. Other options not shown can also be selected, such as various maps, a request for an on-site open house tour, dates and times when the property is scheduled to have a public onsite open house, display "comps" (comparable prices) for the property, draw lines, and other block settings. The agent can set blocks from these options and present them to the end user in any order. When any changes are saved, the property listing format on the website is updated and viewable by others.

Figure 5:
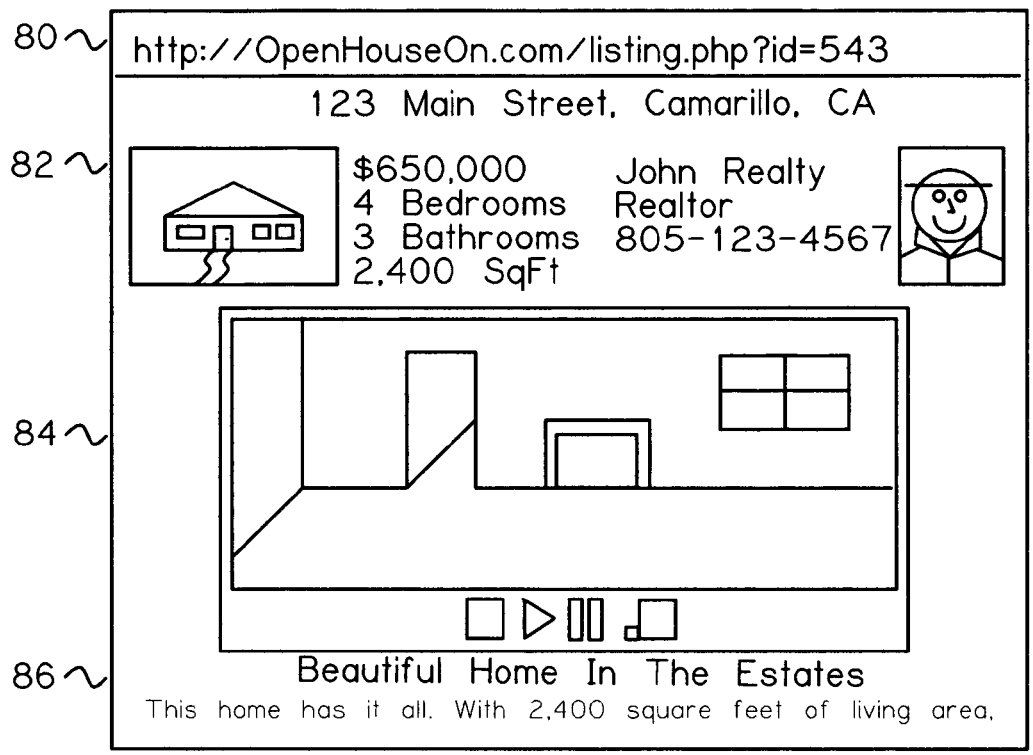
FIG. 5 is a drawing showing the top portion of the website based on FIG. 3's current block content.

FIG. 5 shows the top portion of the website based on FIG. 3's current block settings. The URL 80 is displayed on top as part of the web browser interface. On the web page itself, the first block 82 is set to "A1=Property Info (left), Agent Info (right)". And as can be seen, information regarding the property is displayed to the left and information regarding the real estate agent is displayed to the right. The second block 84 is set to "V1=Video (center)" where the open house video tour is displayed in the center. The third block 86 is set to "R1=Remarks with Title". And as can be seen, the title is centered and is followed by the top portion of the descriptive remarks regarding the property. The format for the rest of the web page would follow the block settings as defined for the property listing. The order of these blocks can easily be rearranged, new blocks added, and existing blocks removed. Any number of blocks can be defined. Any blocks defined as blank are not displayed on the web page.

While the above example is for real estate websites, this method is not limited to only the real estate field and can be used for any other type of websites to support an easier, more configurable, and dynamic method to customize a website.

Interactive Open House Video Tours

Imagine while viewing an open house video tour, you could make decisions on where you wanted to go next on the tour. This would be very similar to an actual open house tour when you are physically present and where you make decisions on what to see next.

When a user is viewing an open house video tour online for a property, the tour can simulate an actual open house tour using numerous video clips or multi-track videos to allow the user to decide where to go next. For example, the user could initially start their open house tour in the front of the home. They could decide to either go through the front door or to turn 360 degrees to view the neighborhood. If the user decides to enter through the front door, the user would likely enter the living room first. In the living room, the user can turn 360 degrees. As the user's view is turning, the user may choose to walk upstairs to see the bedrooms, walk down a hallway towards the laundry room or den, enter the kitchen, or enter other rooms. In another embodiment the user simply views the video and does not interact with the video, the open house video tour would be played from start to finish following a default path.

A number of methods can be used to support interactive open house video tours. Below are various examples, none of which should limit the overall method.

For example, "video marks" can be embedded in the video. A start mark and end mark along with the location of an associated video clip (e.g., as specified by a URL) can be used. As the user starts viewing the open house video, the user can select the video while between the two marks. If the user selects the video between the start and end mark, the user will interrupt the current video and begin viewing the associated video clip. Start and end marks can be associated with frames in the video.

Users can "select" the video using any means, such as clicking a mouse button on the video, pressing a key on the keyboard, or touching the video on a touch screen while the video is being viewed. Users can optionally be provided with visual or audio cues to indicate when the video can be selected.

Another approach is to keep track of how long the video has been running. If a user selects the video between a specified start and end time, then the user is redirected to view a different video clip.

A third way to support interactive video tours is to define a "map" on the video itself. Unlike a static map supported by HTML today, this map is constantly tracking its position and related attribute values as the image moves in front of the user. The map could be as simple as specifying a fixed shaped rectangular box area that covers, say, a doorway. Or can be more complicated as an area associated with an object in the video where as the object becomes bigger or smaller, the area which the user can select from also becomes bigger or smaller respectively. As the object appears and moves in the video, if the user selects the area where the map is defined, the user would then begin viewing a different video clip.

There could be many objects displayed on the screen at the same time, e.g., two doorways where the user can decide which door to "walk" into. Or the user could select an object in the video and details regarding the object could be played. For example, if the user selected an oven range, refrigerator, or windows in the kitchen, the details regarding the selected object could be displayed by playing an informative video or pop up a new window with information about the object. When done viewing the video or pop up information, the user would return to and watch the original video tour.

A fourth way to support interactive video tours is to support multi-track videos. If the user selects, say, a door in the video, the video track being played would switch to another video track and begin playing. This approach has the advantage of not requiring a separate video file from being downloaded and may provide a quicker transition to the video desired to be played next.

This differs from the systems that use multi-track video defined to display multiple videos at once, or to view each video from the start by selecting a specific video from a list of videos, or viewing a list of videos one after the other. In our approach, the user interacts with the video itself to interrupt the current video and to determine which video to view next.

Open house video tours can optionally be set up with visual decision points and paths. A visual decision point, also called a transition decision point, is a location where viewers can decide what to see next. When a visual decision point is reached, the default may be to have the user's view turn 360 degrees or to allow the user to control their view allowing them to move left or right. Users can select where to go next by selecting from the video and move in the direction towards the next visual decision point. Using this approach, users can move from one room to the next, into a garage, or to the front or back of the property.

Figure 6:
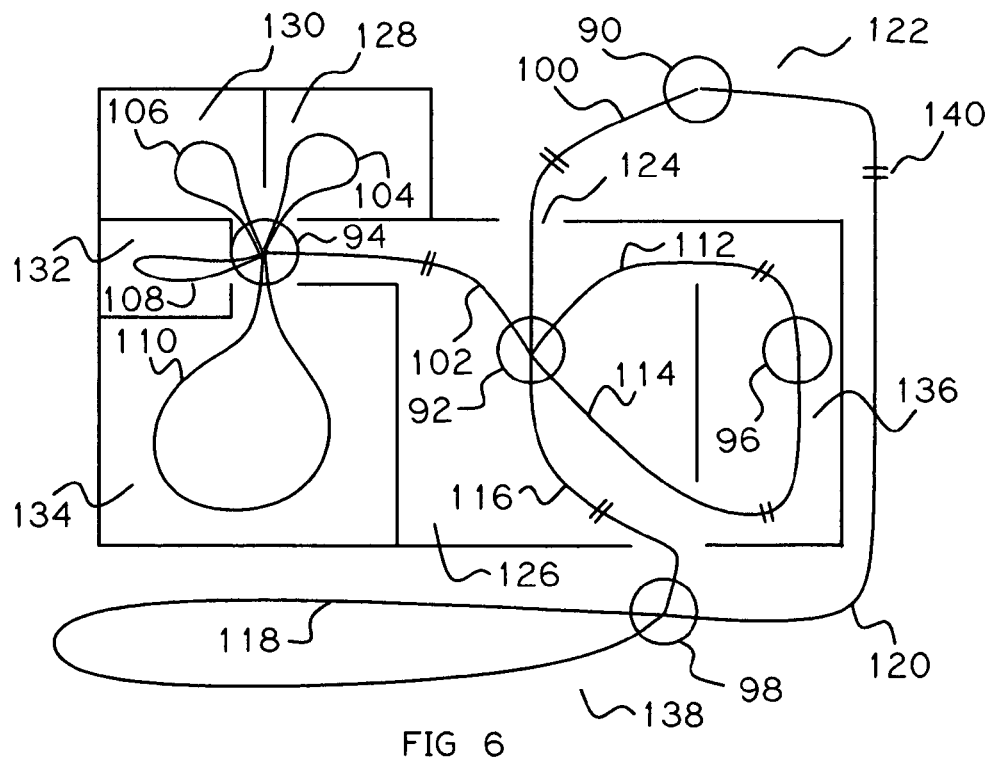
FIG. 6 is a drawing showing one layout for an interactive open house virtual tour. Visual decision points and paths are defined to allow the viewer to decide what to view next while viewing an open house video tour.

FIG. 6 shows one layout for an advanced version of an interactive open house virtual tour where visual decision points and paths are defined. Visual decision points, 90 through 98, and paths, 100 through 120, are defined to allow the viewer to decide what to view next and the paths to take while viewing an open house video tour. Paths 104, 106, 108, 110, and 118 have no double marking 140 and represent paths that have only one video defined. Paths 100, 102, 112, 114, and 120 which are shown with a double marking 140 indicate two videos are defined to support viewing the path in both directions.

In FIG. 6, the interactive open house video tour can start and end at the visual decision point 90 located in front yard 122. At 90, the user's view can turn 360 degrees and then enter the property through the front door 124 to enter the living room 126. Optionally, the user can take path 120 to go to the backyard 138. When the video reaches the visual decision point 92, the user can view the living room by turning 360 degrees. As the user's view is turning, the user may choose to walk on path 102 towards the bedrooms, 128, 130, and 134, and bathroom 132; path 112 towards the kitchen 136; path 114 towards an alternative route to the kitchen 136; path 116 to go into the backyard 138; or, path 100 to go back to the front yard 122.

In another embodiment the user does not interact with the video, the default path through the property is viewed, which in this case could be defined as following visual decision points and paths: 90, 100, 92, 102, 94, 104, 94, 106, 94, 108, 94, 110, 94, 102, 92, 112, 96, 114, 92, 116, 98, 118, 98, 120, and 90.

If the user interacts with the video and deviates from the default path, the software or any other means can accommodate the change and at the next visual decision point follow a path not yet taken. For example, if the user enters the living room 126 for the first time, and at the visual decision point 92, decides to enter the kitchen 136 using path 114 and then follows path 112, without user interaction the software or any other means will select path 102 to view the yet unseen bedrooms 128, 130, 134, and bathroom 132 automatically. Afterwards without any further user interaction, the user will follow path 116 to go into the backyard 138 and follow the default path from that point on.

Compare this approach with systems that are based on photos which magically "transport" a user from the center of one room to the center of the next without the user having any knowledge or feel on how one got there. Using the above approach, video clips can be used to simulate walking the user from one location to the next and does so without requiring a building schematic to show the overall layout of the property.

While the above examples show different approaches for supporting an interactive open house tour, these examples should not limit the overall method described. Nor should this method be limited to only the real estate field as it can be used to support other areas and applications.

Although the present invention has been described in considerable detail with references to certain preferred versions thereof, other versions are possible. For example, FIGS. 7 and 8 show two screen shots representing the buyer's view of a currently implemented version of an Interactive Open House Video Tour™.

Figure 7:
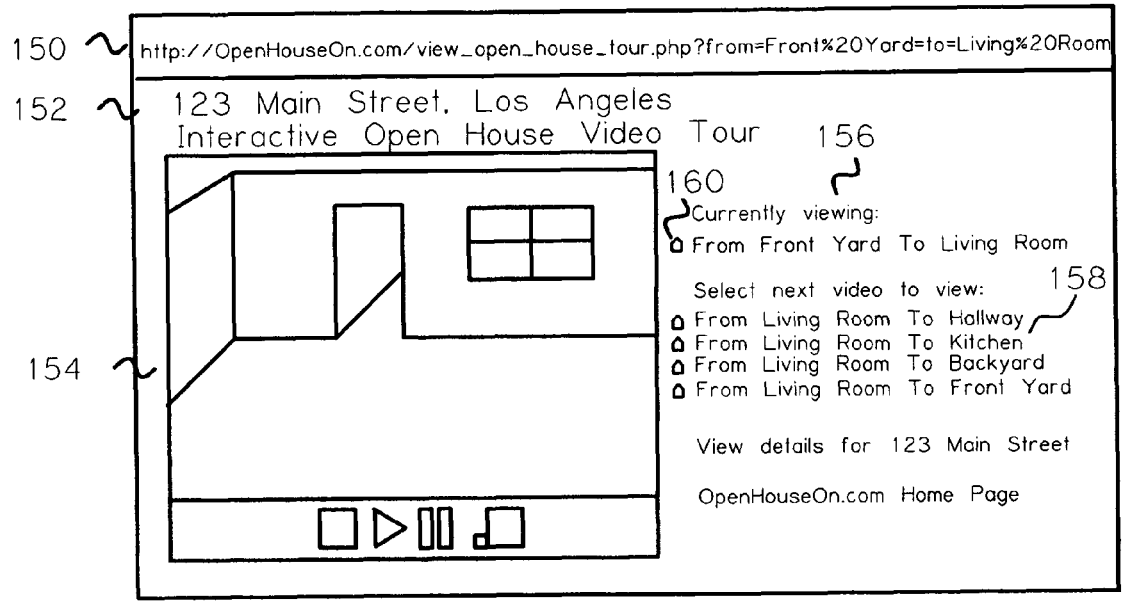
FIG. 7 is a drawing showing an interactive open house video tour where the viewer is currently viewing a video from the front yard to the living room.

FIG. 7 depicts another embodiment of the present invention, where the buyer using a web browser has chosen to view an interactive open house video tour, which displays a URL 150 and the address and city 152 of the property. The buyer or viewer is currently viewing a short video clip 154. To the right of the video, the currently being viewed path 156 by the buyer is displayed. As shown in the figure, the buyer is currently viewing a video from the front yard to the living room. Once in the living room, the buyer can select the next video to view. The possible paths 158 to view next from the living room are to the hallway, kitchen, backyard, or front yard. In front of each possible path is a color coded icon, for example a home icon 160 is displayed. The selected path performs the function of controlling an interactive display route by activating a mapped hyperlink. The mapped hyperlink activates a clip of video that is particular to the selected path. If the home icon 160 is colored red, the path has not been viewed. If the home icon 160 is blue, the path has already been viewed, but can be viewed again. For this property, the paths listed match the choices the buyer could make if this were a physical on-site open house tour from the living room. For example, there is no path defined from the living room directly to the master bedroom, since you would first need to go from the living room to the hallway and from the hallway to the master bedroom. Rather than having the buyer interact with the video itself as described in a previously described embodiment, this approach allows the buyer to choose what to view next using a link linking a particular path using HTML hypertext links which are identified by the path names, e.g., the path named "From Living Room To Hallway" is a link. The selection of a particular HTML hypertext link is one way to support a transition decision point that allows the buyer to decide what to view next. The buyer can interrupt the current video being played and start the next video to view by clicking on a link at any time. The buyer can also select links to view property details for 123 Main Street or view the website's home page which will terminate the interactive session with the interactive open house video tour.

Figure 8:
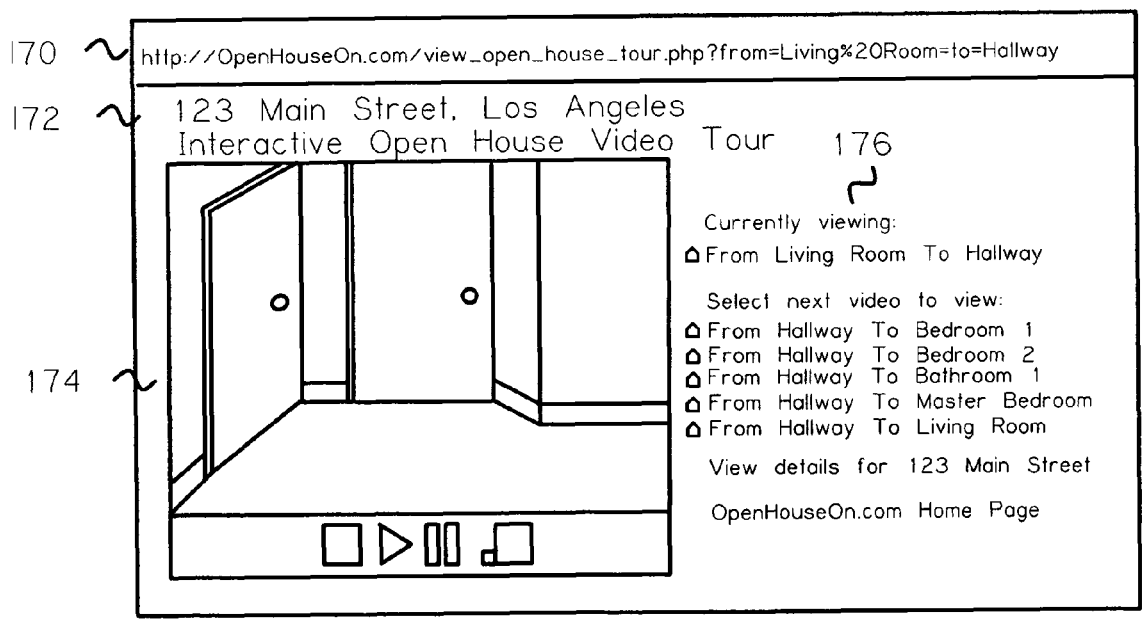
FIG. 8 is a drawing showing an interactive open house video tour where the viewer is currently viewing a video from the living room to the hallway.

FIG. 8 assumes the buyer selected the "From Living Room To Hallway" path in FIG. 7. In FIG. 8 the web browser displays the URL 170 and the address and city 172 of the property. The buyer is viewing a short video clip 174. The buyer's current location and possible paths 176 show that the buyer is currently viewing a video from the living room to the hallway. From the hallway, the next videos the viewer can view are from the hallway to bedroom 1, bedroom 2, bathroom 1, master bedroom, or back to the living room. The buyer's view is a method and means to control the transformed image direction of motion.

The agent and others can define the various paths based on the property's layout. Three parameters are entered for each path: From, To, and Path Id. These entries are saved in the database. If there are two or more paths, say, from the living room to the kitchen, the path id value can be used to uniquely identify each path. For each path, the agent uploads an associated video clip. When all video clips are uploaded, the agent is done defining the open house tour. To help agents, a state diagram of the property similar to FIG. 6 can be drawn and possible paths defined. Paths shown with a double marking 140 indicate two videos are defined to support viewing the path in both directions, while the other paths only have one video defined.

When an interactive open house video tour is selected by the buyer, the database is queried to obtain property information and to select the From, To, and Path Id for each path defined. A session array is initialized with the above information and the buyer's browser is redirected to a second function to view the property.

There are no database calls in the second function, which would slow down the application. Yet, the function is able to maintain which video clips the buyer has viewed. It does this by updating the session array. Under "Currently viewing:", the "From" and "To" path is displayed. To list the next paths that can be viewed, the software first checks to see if the "To" value of what is currently being viewed matches the "From" value defined for each path in the session array. If a match is found, the path is listed. If no matches are found, then the "From" value of what is currently being viewed is compared with the "From" value for each path in the session array. If a match is found, the path is listed. Each path listed is a hypertext link that calls the second function again with parameters.

Compared with the prior art, this approach has the following advantages. First, rather than download a video tour of the entire residential or commercial property, which would be stored in a large file and can take a long time to download, small files containing short video clips are downloaded and viewed only when the path is requested by the buyer. This significantly improves the responsiveness of the website when buyers are viewing a property. Second, the buyer can chose where to go next based on the buyer's current location. This interaction helps to simulate an actual on-site open house tour. Third, by using HTML hypertext links with the from, to, and if needed, path id defined, along with session array storage, the second function can support an interactive open house video tour using standard software found on most personal computers. A vast majority of users will not need to download any software to run an interactive open house tour based on the approach just discussed. Fourth, this approach only reads the database once to initialize a session array. A session array is used to keep track of which paths have been viewed. This state diagram information would normally be lost or would require constant access to a database to select and update the database to maintain this information. In our approach, the database only needs to be queried once to initialize the session array even when multiple buyers are viewing an interactive open house video tour of the same property at the same time. This approach significantly reduces the load on the database.

It should be understood that the method and apparatus for enhancing open house video tours for real estate properties has been described above and in considerable detail but are merely illustrative applications of the overall principles of the present invention. Numerous modifications may be made by those skilled in the art without departing from the spirit and scope of the invention. Therefore, the spirit and scope of the appended claims should not be limited to the description of the preferred versions contained herein.

What is claimed is:

1. A method of conducting an interactive open house video tour provided by a website when said website is in communication with a plurality of computing devices, said method comprising:

uploading to said website from a first computing device at least one user created video stream wherein said user created video stream contains a video image of a property;

uploading to said website from said first computing device a plurality of user provided identification data wherein said plurality of user provided identification data corresponds to said user created video stream;

transforming said video image of said property into a digital data set wherein said digital data set is a transformed image of said property;

inserting within said transformed image at least one transition decision point wherein said transition decision point contains a coordinate that correlates to a transformed image direction of motion;

storing said transformed image of said property on said website;

tagging said transformed image of said property with said plurality of user provided identification data wherein said user provided identification data are used to locate said transformed image of said property stored on said website;

establishing an interactive session between a second computing device and said website;

accepting a user query from said second computing device wherein said user query is accepted by a user interface provided by said website, wherein said user query includes identification data that would allow the system to provide a specific listing with agent-specific details and provide the listing in an agent-specific format/order;

comparing said user query to said plurality of user provided identification data stored on said website wherein a result of a comparison produces a match result;

retrieving said transformed image of said property from said website based upon said match result;

downloading said transformed image from said website to said second computing device at download rate wherein said transformed image is displayed on an interactive display device controlled by said second computing device;

responding to a path command initiated by a second user making a selection of said transition decision point displayed on said interactive display device wherein said path command directs a playback sequence of said transformed image of said property for display on said interactive display device, said playback sequence having a direction of motion correlated to said selection of said transition decision point;

identification means to direct a said interactive display route that follows a default path through said property; and terminating said interactive session upon receiving a terminate command initiated from said interactive display device.

2. The method of claim 1, wherein said of plurality of computing devices includes portable computing devices, handheld computing devices, and cellular computing devices.

3. The method of claim 1, wherein said transformed image of said property provided by a selling agent is selected from the group consisting essentially of: an internal image of a residential property, an internal image of a commercial property, an internal image of undeveloped property, an internal image of industrial property, an internal image of a motorized vehicle, an internal image of an aircraft, and an internal image of a water vessel.

4. The method of claim 1 wherein a formatting means to provide a said specific listing with said agent-specific details and provide the said listing in an said agent-specific format/order using at least one block wherein a content of said block is input by an agent in communication with said website, said block is further comprised of a plurality of data structures wherein said plurality of data structures contain a selling agent's contact information, a real estate office contact information, a physical location of a subject depicted in said transformed image of said property, a selling price of said subject depicted in said transformed image of said property, a square footage of said subject depicted in said transformed image of said property, and a computer memory address corresponding to the location of said transformed image residing on said website.

5. The method of claim 1 wherein responding to a default path command initiated by a second user displayed on said interactive display device wherein said default path command directs a said playback sequence of said transformed image of said property for display on said interactive display device, said playback sequence a said interactive display route that follows a said default path through said property.

6. The method of claim 1, wherein said transformed image of said property is a said video stream created for different media players, wrappers, codecs, data rates, frame rates, aspect ratios, resolution, and audio.

7. An interactive open house video touring system comprising:

a webserver wherein said webserver hosts an interactive open house video touring website;

a first internet communications connection between said website and an agent's computing device;

a second internet communications connection between said website and a buyer's computing device;

a first agent's interface in communication with said interactive open house video touring website wherein said first agent's interface accepts for uploading an open house video stream uploaded from said agent's computing device;

a second agent's interface in communication with said interactive open house video touring website wherein said second agent's interface accepts for uploading a plurality of attributes assigned to property that is the subject of said interactive digital open house video stream from said agent's computing device;

a conversion system wherein said conversion system converts said open house video stream into an interactive digital open house video stream;

an editing interface wherein said editing interface adds a set of agent content to said interactive digital open house video stream;

a search interface in communication with said interactive open house video touring website wherein said search interface accepts a first input from a buyer, wherein said search interface includes identification data that would allow the system to provide a specific listing with agent-specific details and provide the listing in an agent-specific format/order, said first input contains at least one of said plurality of attributes assigned to said property that is the subject of said interactive digital open house video stream, said search interface having as an output said interactive digital open house video stream corresponding to said first input from said buyer;

a download interface in communication with said interactive open house video touring website wherein said download interface retrieves a particular digital open house video stream based upon said output, said download interface downloads to said buyer's computing device said particular digital open house video stream;

a display interface in communication with said interactive open house video touring website, said display interface lists an agent's identification information and a set of descriptors to describe a said plurality of attributes for said property that is the subject of said interactive digital open house video stream;

an interactive interface in communication with said interactive open house video touring website, said interactive interface is operated by a second input from said buyer's computing device wherein said second input determines an interactive display route through said interactive digital open house video stream; and an interactive interface in communication with said interactive open house video touring website, said interactive interface is operated by a second input from said buyer's computing device wherein said second input determines a default path display route through said interactive digital open house video stream.

* * * * *